United States Patent
Chang-Chian et al.

(10) Patent No.: US 11,120,722 B2
(45) Date of Patent: Sep. 14, 2021

(54) DATA TRANSMISSION METHOD AND DISPLAY DRIVING SYSTEM

(71) Applicant: Novatek Microelectronics Corp., Hsinchu (TW)

(72) Inventors: Po-Chuan Chang-Chian, Hsinchu County (TW); Chun-Yi Chou, Hsinchu (TW); Wing-Kai Tang, Hsinchu (TW); Ching-Chun Lin, New Taipei (TW); Chih-Wei Tang, Penghu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/664,923

(22) Filed: Oct. 27, 2019

(65) Prior Publication Data

US 2020/0058244 A1   Feb. 20, 2020

Related U.S. Application Data

(63) Continuation of application No. 13/451,018, filed on Apr. 19, 2012, now Pat. No. 10,515,576.

(30) Foreign Application Priority Data

Aug. 19, 2011   (TW) .................. 100129803

(51) Int. Cl.
*G09G 3/20* (2006.01)
*G06F 3/14* (2006.01)
(52) U.S. Cl.
CPC ............. *G09G 3/20* (2013.01); *G06F 3/1431* (2013.01); *G09G 2370/08* (2013.01); *G09G 2370/10* (2013.01)

(58) Field of Classification Search
CPC .. G09G 3/20; G09G 2370/08; G09G 2370/10; G09G 5/227; G09G 5/391;
(Continued)

(56) References Cited

U.S. PATENT DOCUMENTS 6,078,318 A * 6/2000 Mori .................... G09G 3/3629
345/204
2007/0052857 A1* 3/2007 Song ..................... G09G 5/006
348/565

(Continued)

*Primary Examiner* — Kent W Chang
*Assistant Examiner* — Sujit Shah
(74) *Attorney, Agent, or Firm* — JCIPRNET

(57) ABSTRACT

A data transmission method applied in a display, which includes a display panel, is provided. The data transmission method includes the following steps of: providing a host controller and n display drivers, n is a natural number greater than 1; providing a communication link under mobile industry processor interface (MIPI), connecting the host controller to the n display drivers; determining n virtual channel values Vc1-Vcn corresponding to the respective n display drivers; employing the host controller for providing a command with a virtual channel parameter through the communication link under MIPI; when the virtual channel parameter corresponds to an $i^{th}$ virtual channel values Vci, an $i^{th}$ display driver executing corresponding operations in response to the command, while the rest n−1 display drivers ignoring the command, wherein i is a natural number smaller than or equal to n.

25 Claims, 6 Drawing Sheets

(58) Field of Classification Search
CPC .. G09G 5/00; G09G 3/006; G09G 2300/0426; G09G 2330/10; G09G 2330/12; G09G 2360/148; G06G 3/1431
USPC .................................................. 345/699, 204
See application file for complete search history.

(56) References Cited

U.S. PATENT DOCUMENTS

| | | | |
|---|---|---|---|
| 2007/0165710 A1* | 7/2007 | Alameh | H04L 25/0286 375/220 |
| 2009/0033650 A1* | 2/2009 | Takeda | G09G 3/20 345/214 |
| 2010/0309173 A1* | 12/2010 | Matsuda | G09G 3/3674 345/204 |
| 2011/0156936 A1* | 6/2011 | Kim | H04L 25/14 341/100 |
| 2011/0285734 A1* | 11/2011 | Shiohara | H04N 5/0675 345/581 |
| 2012/0110215 A1* | 5/2012 | Tai | G06F 1/3287 710/14 |
| 2012/0242628 A1* | 9/2012 | Yuan | G09G 3/3611 345/204 |

* cited by examiner

DATA TRANSMISSION METHOD AND DISPLAY DRIVING SYSTEM

CROSS-REFERENCE TO RELATED APPLICATION

This is a continuation application of and claims the priority benefit of U.S. application Ser. No. 13/451,018, filed on Apr. 19, 2012, which claims the priority benefit of Taiwan application serial no. 100129803, filed on Aug. 19, 2011. The entirety of each of the above-mentioned patent applications is hereby incorporated by reference herein and made a part of this specification.

BACKGROUND

Field of the Invention

The invention relates in general to a data transmission method and display driving system using the same, and more particularly to a data transmission method and display driving system applied on a communication link under mobile industry processor interface (MIPI).

Description of the Related Art

In the present age, small-sized or medium-sized display have been widely applied in various kind of electronic products, such as mobile phones, personal digital assistants (PDA), multi-media players, GPS navigation devices, and so forth. Generally, a single display driver is employed in small or medium sized displays for achieving scan driving and data driving operation of the display panel.

However, drawbacks, such as the limited data channel numbers and the incapability for supporting display panels with higher resolution due to the limited size of the driver IC, rises in displays employing the present solution of a single display driver. As such, how to provide a display driving system capable of supporting more data channel numbers and display panel with higher resolution has became a prominent object for the industries.

SUMMARY OF THE INVENTION

The invention is directed to a data transmission method and a display driving system using the same, wherein multiple display drivers, each of which is configured with a virtual channel value, have been applied in the data transmission method and the display driving system for driving a display panel. The data transmission method and the display driving system directed to by the invention further employ a host controller for providing a command, with virtual channel address capability, under mobile industry processor interface (MIPI), so as to address and accordingly drive the multiple display drivers. Thus, in comparison to conventional display driving solution employing a single display driver, the data transmission method and display driving system using the same, directed to by the invention, are advantageously capable of supporting higher amount of data driving channels and display panels with higher resolution.

According to a first aspect of the present invention, a data transmission method, applied in a display having a host controller and n display drivers, wherein n is a natural number greater than 1. The data transmission method includes the steps of: providing a communication link under mobile industry processor interface (MIPI) between the host controller and the n display drivers; determining n virtual channel values Vc1, Vc2, . . . , and Vcn corresponding to the respective n display drivers; receiving a control command via the communication link under MIPI from the host controller, wherein the control command comprises a virtual channel parameter; an $i^{th}$ display driver among the n display drivers operating according to the control command when the virtual channel parameter of the control command indicates an $i^{th}$ virtual channel values Vci among the n virtual channel values, wherein i is a natural number smaller than or equal to n; and the rest n−1 display drivers among the n display drivers discarding the control command when the virtual channel parameter of the control command indicates the $i^{th}$ virtual channel values Vci.

According to a second aspect of the invention, a display driving system, applied in a display with a display panel, is provided. The display driving system includes a host controller and n display drivers, wherein n is a natural number greater than 1. The host controller provides a control command via a communication link under mobile industry processor interface (MIPI), wherein the control command comprises a virtual channel parameter. The n display drivers correspond to n respective virtual channel values Vc1, Vc2, . . . , and Vcn. An $i^{th}$ display driver among the n display drivers operates according to the control command when the virtual channel parameter of the control command indicates an $i^{th}$ virtual channel values Vci among the n virtual channel values, wherein i is a natural number smaller than or equal to n. The rest n−1 display drivers among the n display drivers discarding the control command when the virtual channel parameter of the control command indicates the $i^{th}$ virtual channel values Vci.

The invention will become apparent from the following detailed description of the preferred but non-limiting embodiments. The following description is made with reference to the accompanying drawings.

DESCRIPTION OF THE EMBODIMENTS

The display driving system according to the present embodiment of the invention employs multiple display drivers for driving a display panel, wherein each of the display drivers is configured with a virtual channel value for the purpose of addressing.

Figure 1:
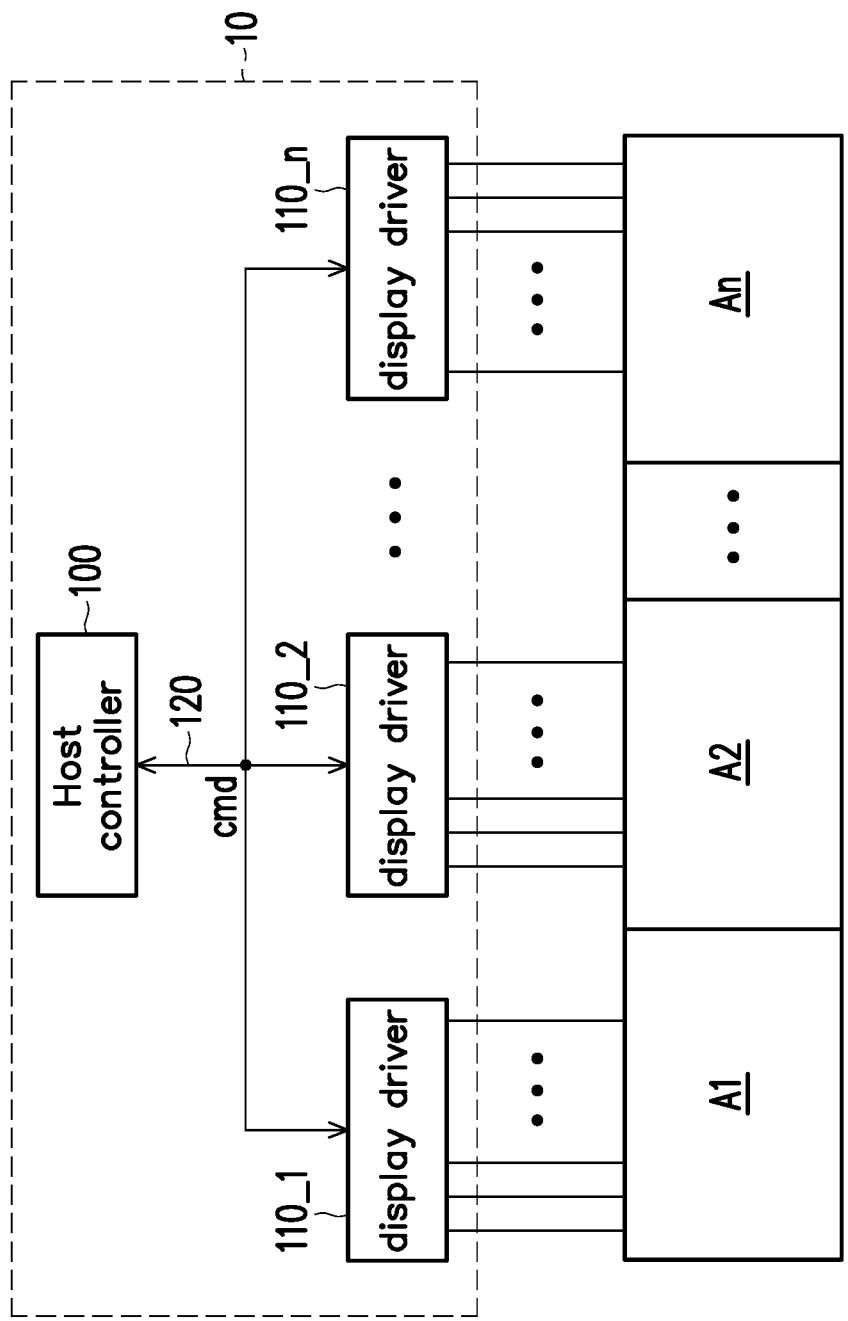
FIG. 1 is a block diagram of a display driving system of a display according to an embodiment of the invention.

Referring to FIG. 1, a block diagram of a display employing a display driving system according to an embodiment of the invention is shown. The display 1 includes a display driving system 10 and a display panel 20. For example, the display panel 20 includes n panel regions A1, A2, . . . , and An, each of which corresponds to a same area and resolution, wherein n is a natural number greater than 1. In an example, n is equal to 3 and the display panel corresponds to a resolution of 1920 by 1080, so that each of the n panel regions A1 to A3 corresponds to a resolution of 640 by 1080.

The display driving system 10 includes a host controller 100 and n display drivers 110_1, 110_2, . . . , and 110_n. The host controller 110 includes a host controller 100 and n display drivers 110_1, 110_2, . . . , and 110_n. The host controller 100 provides a control command cmd via a communication link under mobile industry processor interface (MIPI) 120, wherein the control command cmd comprises a virtual channel parameter. For example, the control command cmd is defined in a display command set (DCS), such as a data transmission request command, a read request command, an indication command of a tearing effect event, an address configuration command for a random access memory, or a data write command.

The n display drivers 110_1 to 110_n respectively determine n virtual channel values Vc1, Vc2, . . . , and Vcn. In an example, n is equal to 3, and the virtual channel values Vc1 to Vc3 respectively correspond to values of 1, 2, and 3.

When the virtual channel parameter of the control command cmd corresponds to an $i^{th}$ virtual channel value Vci among the n virtual channel values Vc1 to Vcn, the display driver 110_i, corresponding to the $i^{th}$ virtual channel value Vci, operates in response to the control command cmd, while the rest n−1 display drivers accordingly discard the control command cmd, wherein i is a natural number smaller than or equal to n. As such, the display driving system 10 according to the present embodiment of the invention is capable of addressing the control command cmd, provided via the communication link under MIPI 120, by means of configuring the aforementioned virtual channel parameter, so as to have the n display drivers 110_1 to 110_n properly driven.

In the following paragraphs, examples are cited for more clearly having varies operations, achieved with the control command cmd, illustrated.

Data Transmission Request Command and Read Request Command

In a practical example, the control command cmd is a data transmission command or a read request command. As such, the display driver 110_i sends a confirmation signal in response to the data transmission request command, so as to have the host controller 100 noticed that whether a data transmission operation indicated by the data transmission request command is achieved. For example, the operation sequence that the host controller 100 provides the data transmission command and the display driver 110_i accordingly responds with the confirmation signal is illustrated in FIG. 2.

Figure 2:
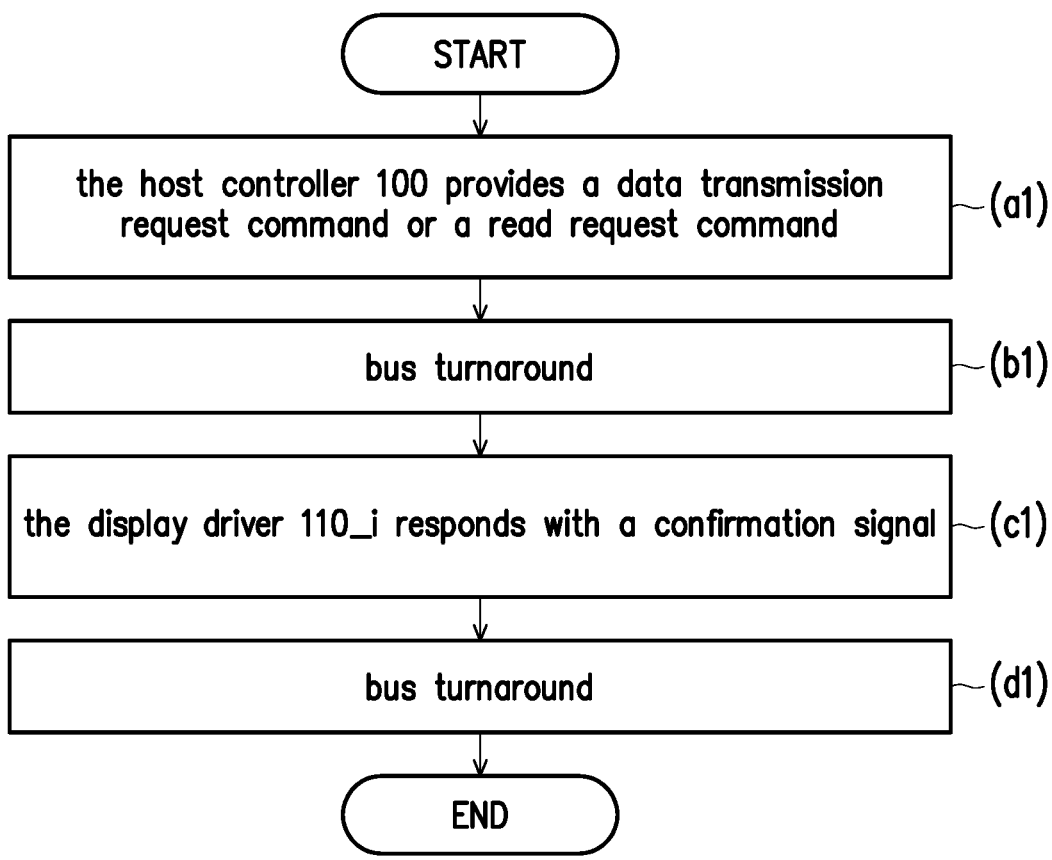
FIG. 2 is a flow chart of the display driving system according to the present embodiment of the invention when the control command cmd is a data transmission request command.

More specifically, the sequence, illustrated in FIG. 2, firstly proceeds to step (a1), in which the host controller 100 provides the data transmission request command, and the virtual channel parameter provided with the data transmission request command indicates the virtual channel value Vci. Next, the sequence proceeds to step (b1), in which the host controller 100 and the display driver 110_i enter a bus turnaround period, wherein the master position of the communication link under MIPI 120, currently taken by the host controller 100, is switched to the display driver 110_i. The sequence then proceeds to step (c1), in which the display driver 110_i sends the confirmation signal to the host controller 100 via the communication link under MIPI 120. After that, the sequence proceeds to step (d1), in which the host controller 100 and the display driver 110_i enter the bus turnaround period once again, so that the master position of the communication link under MIPI 120, currently taken by the display driver 110_i, is switched back to the host controller 100.

Indication Command of a Tearing Effect Event

In another practical example, the control command cmd is an indication command of a tearing effect event, and the virtual channel parameter accordingly corresponds to the virtual channel value Vc1 among the n virtual channel values Vc1 to Vcn. As such, the display driving system 10 could achieve indication and response of the tearing effect event via the first display driver 110_1.

The display driver 110_1 sends a confirmation signal, indicating that whether the host controller 100 is able to provide display data corresponding to a next frame, in response to the indication command of the tearing effect event. For example, the operation sequence that the host controller 100 provides the indication command of the tearing effect event and the display driver 110_1 accordingly responds with the confirmation signal is illustrated in FIG. 3.

Figure 3:
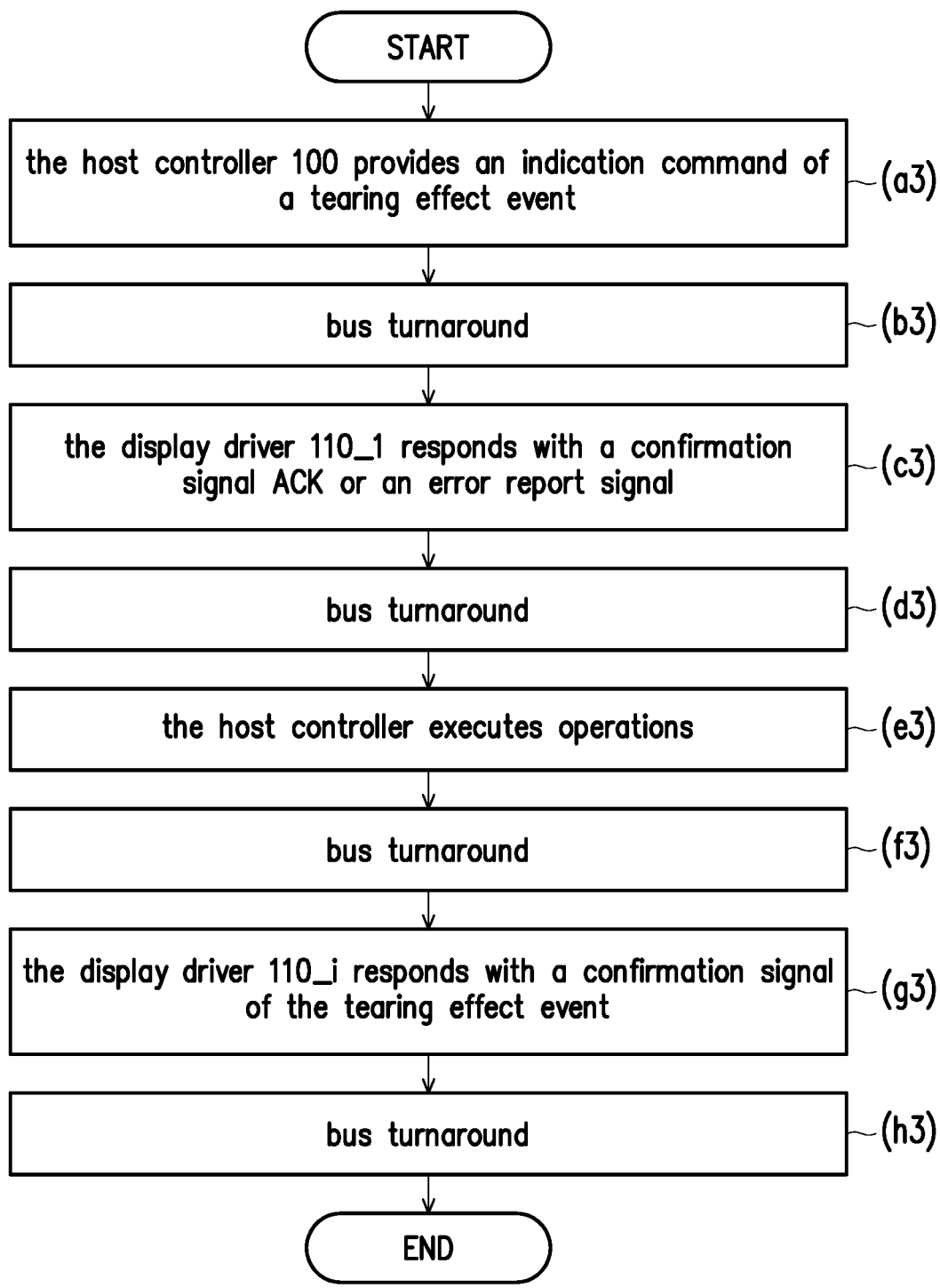
FIG. 3 is a flow chart of the display driving system according to the present embodiment of the invention when the control command cmd is an indication command of a tearing effect event.

More specifically, the sequence, illustrated in FIG. 3, firstly proceeds to step (a3), in which the host controller 100 provides the indication command of the tearing effect event, and the virtual channel parameter of the indication command indicates the virtual channel value Vc1. The sequence next proceeds to step (b3), in which the host controller 100 and the display driver 110_1 enter a bus turnaround period, wherein the master position of the communication link under MIPI 120, currently taken by the host controller 100, is switched to the display driver 110_1. The sequence then proceeds to step (c3), in which the display driver 110_1 sends a confirmation signal ACK or an error report signal to the host controller 100 via the communication link under MIPI 120. After that, the sequence proceeds to step (d3), in which the host controller 100 and the display driver 110_1 enter the bus turnaround period once again, so that the master position of the communication link under MIPI 120, currently taken by the display driver 110_1, is switched back to the host controller 100.

The sequence next proceeds to steps (e3), (f3), (g3), and (h3), wherein steps (e3), (f3), and (h3), with the control operation of the host controller 100, the master position of the communication link under MIPI 120 switched to the display driver 110_1, and then switched back to the host controller 100, are respectively similar to steps (a3), (b3), and (d3). In step (g3), the display driver 110_1 provides and sends a confirmation signal of the tearing effect event back to the host controller 100.

Address Configuration Command for a Random Access Memory and Data Write Command

In still another practical example, the control command cmd is an address configuration command for the RAM or a data write command. For example, each of the display drivers 110_1 to 110_n includes a RAM (not shown), and the $i^{th}$ display driver 110_i having data storage space of its RAM configured in response to the address configuration command, and having data written into the data storage space in response to the data write command. For example, the aforementioned address configuration of memory is executed under a command mode of the MIPI by the host controller 100 and the display driver 110_$i$, so as to achieve data transmission of the display data.

Figure 4:
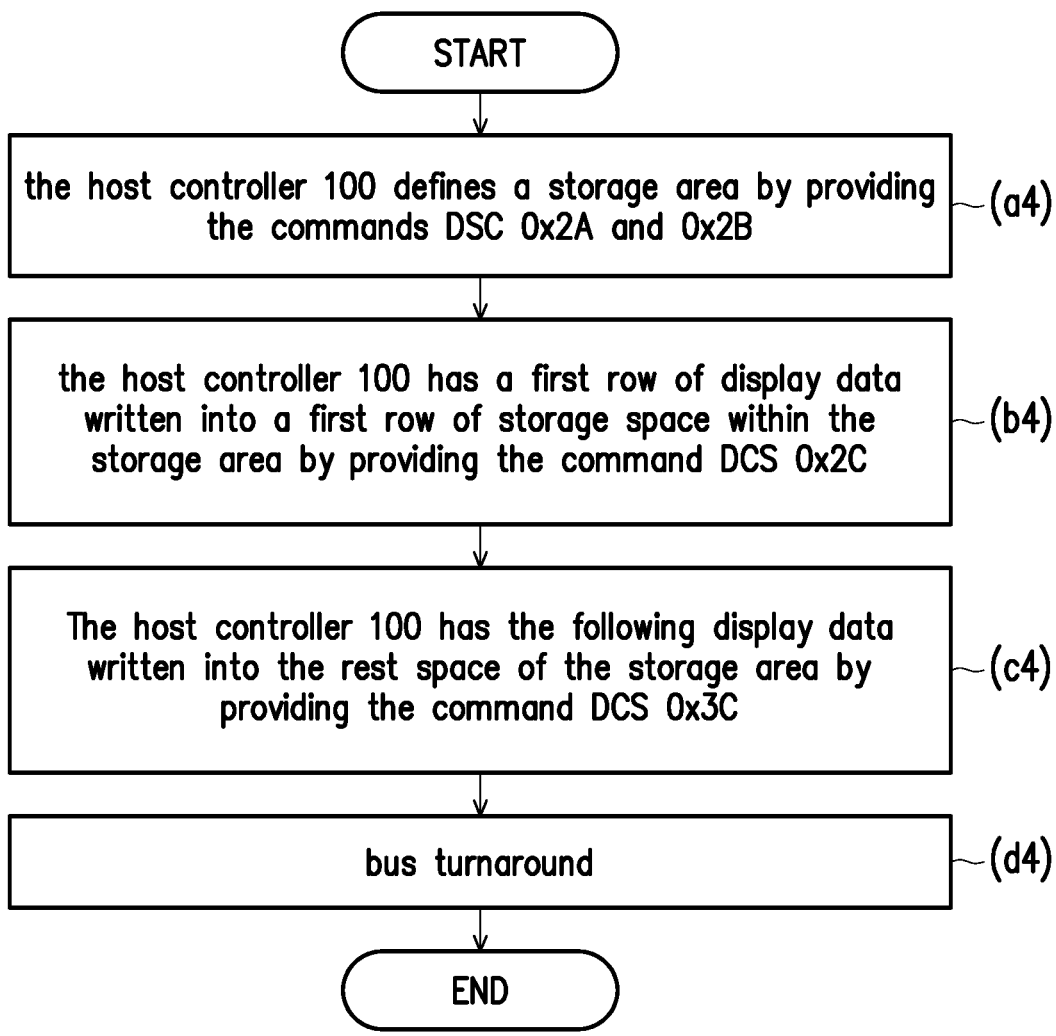
FIG. 4 is a flow chart of the display driving system according to the present embodiment of the invention when the control command cmd is an address configuration command of a random access memory and a data write command.

For example, the address configuration command for the RAM is defined in the DCS as commands 0x2A and 0x2B, and the data write command is defined in the DCS as commands 0x2C and 0x3C. The operation sequence that the host controller 100 provides the address configuration command for the RAM and the data write command is illustrated in FIG. 4.

The sequence firstly proceeds to step (a4), in which the host controller 100 provides the address configuration commands DCS 0x2A and 0x2B for defining a storage area within the RAM of the display driver 110_$i$, wherein the commands DCS 0x2A and 0x2B respectively having an initial address and a terminal address of the storage area determined. The sequence next proceeds to step (b4), in which the host controller 100 provides the data write command DCS 0x2C for having a first row of display data written into a first row of storage space within the storage area. The sequence then proceeds to step (c4), in which the host controller 100 provides the data write command DCS 0x3C for having the following display data written into the rest space of the storage area. After that, the sequence proceeds to step (d4), in which the host controller 100 and the display driver 110_$i$ once again enter the bus turnaround period.

System Idle State

Figure 5:
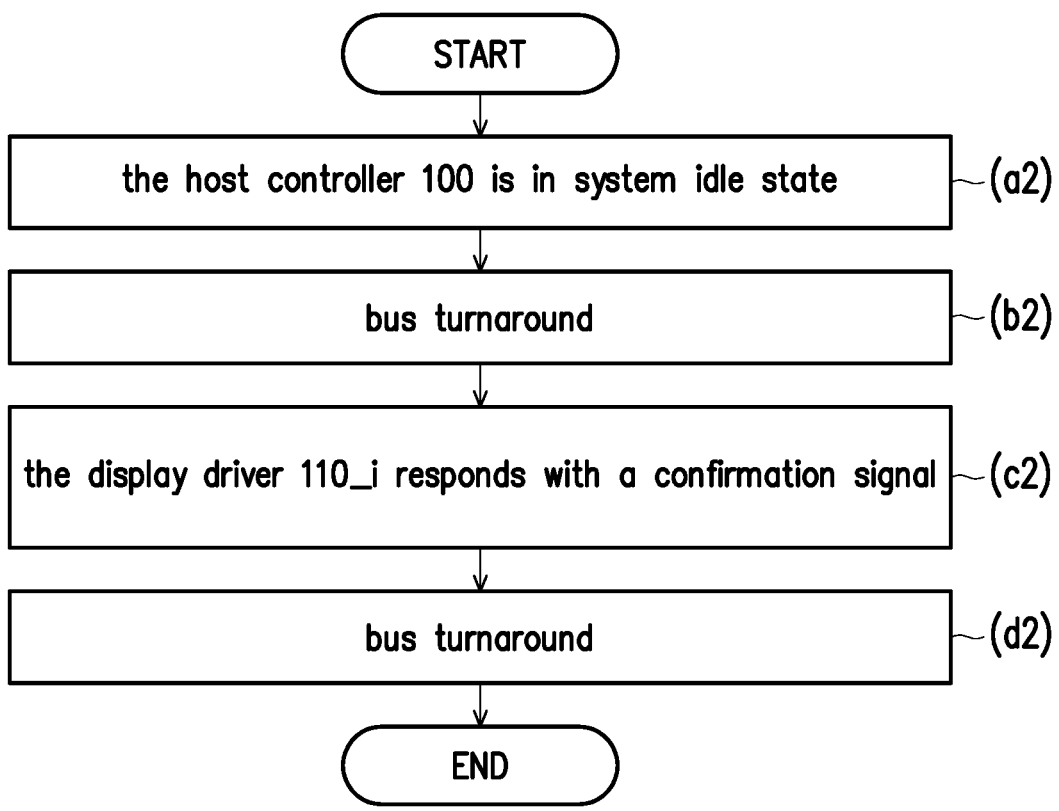
FIG. 5 is a flow chart of the display driving system according to the present embodiment of the invention when the host controller 100 operates in a system idle state.

In a practical example, the host controller 100 operates in a system idle state, in which, for example, the display 1 is turned on and no command has ever been provided. In the present situation, the display driver 110_$i$ sends a confirmation signal, wherein the parameter i could be any initial value preset in the system. The host controller 100, for example, determines whether the communication link under MIPI 120 operates normally according to the confirmation signal sent by the display driver 110_$i$. For example, the operation sequence that the display driver 110_$i$ sends the confirmation signal under the system idle condition is illustrated in FIG. 5, wherein steps (a2) to (d2) are respectively similar to steps (a1) to (d1) illustrated in FIG. 2, and the detail description is accordingly omitted for conciseness.

Though only the situation that the virtual channel parameter of the control command cmd is selectively corresponding to each of the virtual channel values Vc1 to Vcn is illustrated in the present embodiment, the control command cmd is not limited thereto. In other example, the virtual channel parameter of the control command cmd could correspond to other values, so as to have the display drivers 110_1 to 110_$n$ controlled for other operation. For example, the n display drivers 110_1 to 110_$n$ are further configured with a virtual broadcasting value Vcb, and the virtual channel parameter of the control command cmd could also correspond to the virtual broadcasting value Vcb for achieving broadcasting operation on all of the display drivers 110_1 to 110_$n$.

For example, when the virtual channel value of the control command cmd corresponds to the virtual broadcasting value Vcb, the n display drivers 110_1 to 110_$n$ are all enabled and operate according to the control command cmd. As such, broadcasting operation among the n display drivers 110_1 to 110_$n$ by the host controller 110 can be implemented.

Figure 6:
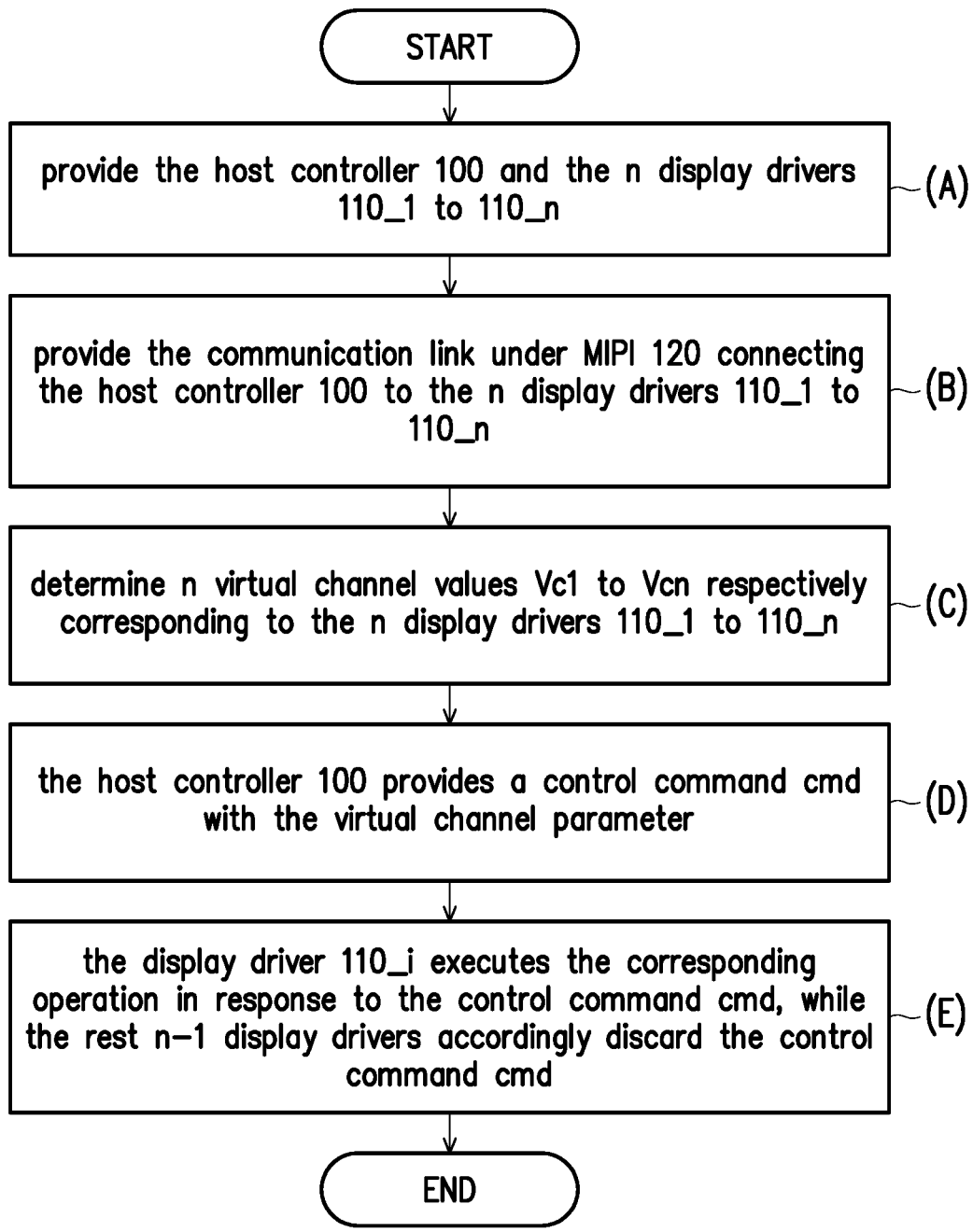
FIG. 6 is a flow chart of the data transmission method according to the present embodiment of the invention.

Referring to FIG. 6, a flow of the data transmission method according of the present embodiment is shown. For example, the data transmission method according to the present embodiment of the invention includes the following steps. Firstly, the data transmission method proceeds to step (A), in which the host controller 100 and the n display drivers 110_1 to 110_$n$ is provided. The data transmission method next proceeds to step (B), in which the communication link under MIPI 120 is provided for connecting the host controller 100 to the n display drivers 110_1 to 110_$n$. The data transmission method then proceeds to step (C), in which n virtual channel values Vc1 to Vcn respectively corresponding to the n display drivers 110_1 to 110_$n$ are determined. The data transmission method next proceeds to step (D), in which the host controller 100 provides a control command cmd with the virtual channel parameter via the communication link under MIPI 120. When the virtual channel parameter of the control command cmd indicates the virtual channel value Vci, the data transmission method proceeds to step (E), in which the display driver 110_$i$ executes the corresponding operation in response to the control command cmd, while the rest n−1 display drivers accordingly discard the control command cmd.

The data transmission method and the display driving system according to the present embodiment of the invention employ multiple display drivers, each of which is configured with a virtual channel value, for driving a display panel. The data transmission method and the display driving system according to the present embodiment of the invention further employ a host controller for providing a command, with virtual channel address capability, under MIPI, so as to address and accordingly drive the multiple display drivers. Thus, in comparison to conventional display driving solution employing a single display driver, the data transmission method and display driving system according to the present embodiment of the invention are advantageously capable of supporting higher amount of data driving channels and display panels with higher resolution.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data transmission method, applied in a display comprising a display panel and a display driving system, wherein the display driving system comprises a host controller and n display drivers, the n display drivers drive the display panel, the display panel comprises a plurality of panel regions, the n display drivers respectively drive corresponding panel regions in the panel regions, n is a natural number greater than 1, wherein the data transmission method comprises:

providing a communication link under mobile industry processor interface (MIPI) to connect the host controller and the n display drivers in parallel, wherein the display drivers are respectively corresponded to n virtual channel values Vc1, Vc2, . . . , and Vcn;

provide a control command from the host controller to the n display drivers via the communication link under MIPI, wherein the control command comprises a virtual channel parameter;

when the virtual channel parameter in the control command corresponds to a broadcasting virtual channel value configured in the n display drivers, the n display drivers execute corresponding operations in response to the control command;

when the virtual channel parameter in the control command corresponds to an $i^{th}$ virtual channel value Vci of the n virtual channel values, an $i^{th}$ display driver of the n display drivers executes a corresponding operation in response to the control command, i is a natural number less than or equal to n; and when the virtual channel parameter in the control command corresponds to the $i^{th}$ virtual channel value Vci, remaining n−1 display drivers of the n display drivers correspondingly discard the control command, wherein after the host controller provides the control command, the host controller hands a mastership of the communication link under MIPI to the $i^{th}$ display driver during a first bus turnaround period, and the $i^{th}$ display driver returns the mastership of the communication link under MIPI to the host controller during a second bus turnaround period after the first bus turnaround period.

2. The data transmission method according to claim 1, wherein the control command is a data transmission request command, the $i^{th}$ display driver correspondingly returns a response confirmation signal in response to the data transmission request command to notice the host controller whether a data transmission operation corresponding to the data transmission request command is achieved.

3. The data transmission method according to claim 1, wherein the control command is a read request command, the $i^{th}$ display driver correspondingly returns a response confirmation signal in response to the read request command to notice the host controller whether a data transmission operation corresponding to the read request command is achieved.

4. The data transmission method according to claim 1, wherein when the host controller is in a system idle state, the $i^{th}$ display driver correspondingly returns a response confirmation signal.

5. The data transmission method according to claim 1, wherein the control command is an indication command of a tearing effect event, the $i^{th}$ display driver correspondingly returns a response confirmation signal in response to the indication command of the tearing effect event to indicate the host controller whether to provide display data corresponding to a next frame.

6. The data transmission method according to claim 5, wherein when the control command is the indication command of the tearing effect event, the virtual channel parameter in the control command is a virtual channel value corresponding to a specific display driver.

7. The data transmission method according to claim 1, wherein the control command is an address configuration command for a random access memory (RAM), the $i^{th}$ display driver comprises a RAM, the $i^{th}$ display driver correspondingly sets a data storage space of the RAM in response to the address configuration command for the RAM.

8. The data transmission method according to claim 7, wherein the control command is further a data write command, and the $i^{th}$ display driver correspondingly writes a transmission data provided by the host controller into the data storage space in response to the data write command.

9. The data transmission method according to claim 1, wherein the control command is defined in a display command set.

10. A data transmission method, applied in a display comprising a display panel and a display driving system, wherein the display driving system comprises a host controller and n display drivers, the n display drivers drive the display panel, the display panel comprises a plurality of panel regions, the n display drivers respectively drive corresponding panel regions in the panel regions, n is a natural number greater than 1, wherein the data transmission method comprises:

providing a communication link under mobile industry processor interface (MIPI) to connect the host controller and the n display drivers in parallel, wherein the display drivers are respectively corresponded to n virtual channel values Vc1, Vc2, . . . , and Vcn;

providing a control command from the host controller to the n display drivers via the communication link under MIPI, wherein the control command comprises a virtual channel parameter;

when the virtual channel parameter in the control command corresponds to an $i^{th}$ virtual channel value Vci of the n virtual channel values, an $i^{th}$ display driver of the n display drivers executes a corresponding operation in response to the control command, i is a natural number less than or equal to n; and when the virtual channel parameter in the control command corresponds to the $i^{th}$ virtual channel value Vci, remaining n−1 display drivers of the n display drivers correspondingly discard the control command, wherein the control command is an indication command of a tearing effect event, the virtual channel parameter in the control command is a virtual channel value corresponding to a specific display driver, and the specific display driver correspondingly returns a response confirmation signal in response to the indication command of the tearing effect event to indicate the host controller whether to provide display data corresponding to a next frame.

11. A data transmission method, applied in a display comprising a display panel and a display driving system, wherein the display driving system comprises a host controller and n display drivers, the n display drivers drive the display panel, the display panel comprises a plurality of panel regions, the n display drivers respectively drive corresponding panel regions in the panel regions, n is a natural number greater than 1, wherein the data transmission method comprises:

providing a communication link under mobile industry processor interface (MIPI) to connect the host controller and the n display drivers in parallel, wherein the display drivers are respectively corresponded to n virtual channel values Vc1, Vc2, . . . , and Vcn;

providing a control command from the host controller to the n display drivers via the communication link under MIPI, wherein the control command comprises a virtual channel parameter;

when the virtual channel parameter in the control command corresponds to a broadcasting virtual channel value, the n display drivers execute corresponding operations in response to the control command;

when the virtual channel parameter in the control command corresponds to an $i^{th}$ virtual channel value Vci of the n virtual channel values, an $i^{th}$ display driver of the n display drivers executes a corresponding operation in response to the control command, i is a natural number less than or equal to n; and when the virtual channel parameter in the control command corresponds to the $i^{th}$ virtual channel value Vci, remaining n−1 display drivers of the n display drivers correspondingly discard the control command, wherein when the control command is an address configuration command for a random access memory (RAM), the $i^{th}$ display driver comprises a RAM, the $i^{th}$ display driver correspondingly sets a data storage space of the RAM in response to the address configuration command for the RAM, and when the control command is further a data write command, and the $i^{th}$ display driver correspondingly writes a transmission data provided by the host controller into the data storage space in response to the data write command.

12. The data transmission method according to claim 11, wherein the host controller sequentially executes the following steps:
providing a plurality of address configuration command for the RAM to define a used segment of the RAM in the plurality of display drivers;
providing a first data write command to write first row of display data into a corresponding first row storage space within the used segment of the RAM; and
providing at least one second data write command to write the subsequent rows of the display data into the respective remaining storage spaces within the used segment of the RAM.

13. A display driving system, applied in a display comprising a display panel and the display driving system, wherein the display driving system comprises:
a host controller, configured to provide a control command via a communication link under mobile industry processor interface (MIPI), wherein the control command comprises a virtual channel parameter,
n display drivers, respectively corresponded to n virtual channel values Vc1, Vc2, . . . , and Vcn, n is a natural number greater than 1, the display drivers drive the display panel, the display panel comprises a plurality of panel regions, the n display drivers are respectively configured to drive corresponding panel regions in the panel regions, the n display drivers are connected to the host controller in parallel via the communication link under MIPI to connect the host controller and the n display drivers in parallel,
wherein when the virtual channel parameter in the control command corresponds to a broadcasting virtual channel value configured in the n display drivers, the n display drivers execute corresponding operations in response to the control command,
wherein when the virtual channel parameter n the control command corresponds to an $i^{th}$ virtual channel value Vci of the n virtual channel values, an $i^{th}$ display driver of the n display drivers executes a corresponding operation in response to the control command, i is a natural number less than or equal to n,
wherein when the virtual channel parameter in the control command corresponds to the $i^{th}$ virtual channel value Vci, remaining n–1 display drivers of the n display drivers correspondingly discard the control command,
wherein after the host controller provides the control command, the host controller hands a mastership of the communication link under MIPI to the $i^{th}$ display driver during a first bus turnaround period, and the $i^{th}$ display driver returns the mastership of the communication link under MIPI to the host controller during a second bus turnaround period after the first bus turnaround period.

14. The display driving system according to claim 13, wherein the control command is a data transmission request command, the $i^{th}$ display driver correspondingly returns a response confirmation signal in response to the data transmission request command to notice the host controller whether a data transmission operation corresponding to the data transmission request command is achieved.

15. The display driving system according to claim 13, wherein the control command is a read request command, the $i^{th}$ display driver correspondingly returns a response confirmation signal in response to the read request command to notice the host controller whether a data transmission operation corresponding to the read request command is achieved.

16. The display driving system according to claim 13, wherein when the host controller is in a system idle state, the $i^{th}$ display driver correspondingly returns a response confirmation signal.

17. The display driving system according to claim 13, wherein the control command is an indication command of a tearing effect event, the $i^{th}$ display driver correspondingly returns a response confirmation signal in response to the indication command of the tearing effect event to indicate the host controller whether to provide display data corresponding to a next frame.

18. The display driving system according to claim 17, wherein when the control command is the indication command of the tearing effect event, the virtual channel parameter in the control command is a virtual channel value corresponding to a specific display driver.

19. The display driving system according to claim 13, wherein the control command is an address configuration command for a random access memory (RAM), the $i^{th}$ display driver comprises a RAM, the $i^{th}$ display driver correspondingly sets a data storage space of the RAM in response to the address configuration command for the RAM.

20. The display driving system according to claim 19, wherein the control command is further a data write command, and the $i^{th}$ display driver correspondingly writes a transmission data provided by the host controller into the data storage space in response to the data write command.

21. The display driving system according to claim 13, wherein the control command is defined in a display command set.

22. A display driving system, applied in a display comprising a display panel and the display driving system, wherein the display driving system comprises:
a host controller, configured to provide a control command via a communication link under mobile industry processor interface (MIPI), wherein the control command comprises a virtual channel parameter; and
n display drivers, respectively corresponded to n virtual channel values Vc1, Vc2, . . . , and Vcn, n is a natural number greater than 1, the display drivers drive the display panel, the display panel comprises a plurality of panel regions, the n display drivers are respectively configured to drive corresponding panel regions in the panel regions, the n display drivers are connected to the host controller via the communication link under MIPI,
wherein when the virtual channel parameter in the control command corresponds to an $i^{th}$ virtual channel value Vci of the n virtual channel values, an $i^{th}$ display driver of the n display drivers executes a corresponding operation in response to the control command, i is a natural number less than or equal to n,
wherein when the virtual channel parameter in the control command corresponds to the $i^{th}$ virtual channel value Vci, remaining n–1 display drivers of the n display drivers correspondingly discard the control command,
wherein the control command is an indication command of a tearing effect event, the virtual channel parameter in the control command is a virtual channel value corresponding to a specific display driver, and the specific display driver correspondingly returns a response confirmation signal in response to the indication command of the tearing effect event to indicate the host controller whether to provide display data corresponding to a next frame.

23. A display driving system, applied in a display comprising a display panel and the display driving system, wherein the display driving system comprises:
  a host controller, configured to provide a control command via a communication link under mobile industry processor interface (MIPI), wherein the control command comprises a virtual channel parameter; and
  n display drivers, respectively corresponded to n virtual channel values Vc1, Vc2, ... , and Vcn, n is a natural number greater than 1, the display drivers drive the display panel, the display panel comprises a plurality of panel regions, the n display drivers are respectively configured to drive corresponding panel regions in the panel regions, the n display drivers are connected to the host controller via the communication link under MIPI,
  wherein when the virtual channel parameter in the control command corresponds to a broadcasting virtual channel value, the n display drivers execute corresponding operations in response to the control command;
  wherein when the virtual channel parameter in the control command corresponds to an $i^{th}$ virtual channel value Vci of the n virtual channel values, an $i^{th}$ display driver of the n display drivers executes a corresponding operation in response to the control command, i is a natural number less than or equal to n; and
  wherein when the virtual channel parameter in the control command corresponds to the $i^{th}$ virtual channel value Vci, remaining n−1 display drivers of the n display drivers correspondingly discard the control command,
  wherein when the control command is an address configuration command for a random access memory (RAM), the $i^{th}$ display driver comprises a RAM, the $i^{th}$ display driver correspondingly sets a data storage space of the RAM in response to the address configuration command for the RAM, and when the control command is further a data write command, and the $i^{th}$ display driver correspondingly writes a transmission data provided by the host controller into the data storage space in response to the data write command.

24. The display driving system according to claim 23, wherein the host controller sequentially executes the following steps:
  providing a plurality of address configuration command for the RAM to define a used segment of the RAM in the plurality of display drivers;
  providing a first data write command to write first row of display data into a corresponding first row storage space within the used segment of the RAM; and
  providing at least one second data write command to write the subsequent rows of the display data into the respective remaining storage spaces within the used segment of the RAM.

25. An operating method for a display driver applicable to a display driving system having a host controller and n display drivers communicating according to a communication link under mobile industry processor interface (MIPI), wherein the n display drivers are for driving a single display panel having n panel regions, each of the panel regions respectively configured to be coupled to and driven by a corresponding one of the n display drivers, and n is a natural number greater than 1, the operating method comprising:
  receiving a control command via the communication link under MIPI from the host controller, wherein the control command comprises a virtual channel parameter;
  driving a corresponding panel region among the n panel regions according to the control command when a virtual channel parameter of the control command does not indicate a corresponding virtual channel value among n virtual channel values respectively corresponding to the n display drivers;
  disregarding the control command when the virtual channel parameter of the control command indicates the corresponding virtual channel value;
  in response to a virtual channel parameter of the control command corresponding to a virtual broadcasting value, performing a broadcasting operation; and
  in response to the virtual channel parameter of the control command corresponding to a certain virtual channel value among the n virtual channel values, operating according to the control command corresponding to an indication command of a tearing effect event.

* * * * *